UNITED STATES PATENT OFFICE.

FRITZ BLAU, OF BERLIN, GERMANY, ASSIGNOR, BY MESNE ASSIGNMENTS, TO GENERAL ELECTRIC COMPANY, A CORPORATION OF NEW YORK.

PRODUCTION OF DIVIDED METALS.

985,386.

No Drawing.

Specification of Letters Patent. Patented Feb. 28, 1911.

Application filed September 14, 1906. Serial No. 334,561.

*To all whom it may concern:*

Be it known that I, FRITZ BLAU, chemist, a subject of the Emperor of Austria-Hungary, and a resident of Berlin, Germany, have invented certain new and useful Improvements in the Production of Divided Metals; and I do hereby declare the following to be a full, clear, and exact description of the invention, such as will enable others skilled in the art to which it appertains to make and use the same.

If tungsten trioxid or tungstic acid or any other oxid, or a salt containing oxygen, be reduced to metallic tungsten by means of hydrogen, say by passing the hydrogen through a heated tube in which the raw material is placed, then right in front at the point where the hydrogen enters there will be found a very small nearly black layer which is chiefly composed of extremely finely divided tungsten still containing a little oxygen. Farther on in the tube there will be found partly metallic tungsten of a gray color, and also a quantity of incompletely reduced oxids, e. g., the brown oxid. By strongly raising the temperature it is easily possible to reduce the whole to metal. In this case however the metal has a far greater density and is less finely divided than the small black layer hereinbefore mentioned, and is materially lighter in color.

Exhaustive thermodynamic studies and investigations have shown it is possible to so conduct the process that the nearly black and very fine product, which is obtained in very small quantities only by the before stated method, shall be the principal or exclusive product. For this purpose the current of hydrogen must be employed in profuse quantity, that is to say for example, twentyfold in excess of that actually required, so that the steam produced during the reaction has only a very small partial pressure. Under these conditions, the reaction, (which if the reaction products are able to mix with the hydrogen in comparatively large quantities, only takes place at a strong red heat or yellow heat), proceeds even at a very weak red heat, and at this low temperature a final product is obtained, which, as already mentioned, is in an extraordinarily fine state of subdivision. The product is mostly spontaneously inflammable or pyrophoric, however, spontaneous inflammability disappears sometimes of itself, but always if the product is flooded with ordinary ether for example while still in the tube. After evaporation of the ether the product remains unaffected by air. The hydrogen which is used in very large excess is of course not lost but can be used again, it being understood that after the water or steam produced during the process is removed, the hydrogen again becomes available for further use. This may be accomplished, for instance, by placing a comparatively large number of reduction vessels in series between which the steam formed is removed, either by drying agents or by cooling down.

Any means which prevents steam from mixing with the reaction mixture in comparatively large quantities is suitable for obtaining tungsten of the quality above mentioned. For example in the reaction vessels and next the material to be reduced may be placed metallic magnesium which immediately decomposes the steam and forms hydrogen again.

The improved process described is not only applicable for metallic tungsten but also for metals of a similar kind, e. g. molybdenum.

The product obtained according to the method described is in consequence of its fine state of subdivision an excellent raw material for all kinds of purposes particularly for the manufacture of incandescent lamp filaments. The small quantity of oxygen which it mostly contains is not injurious.

The reduction can be carried out not only by means of hydrogen but also for example by means of methyl alcohol vapor or other gases or vaporous reducing agents containing carbon, always with the precaution that the higher oxidized products must never exert an appreciable partial pressure.

What I claim is:—

1. A process for producing finely divided tungsten which consists in reducing oxygen compounds of tungsten by means of a very large excess or profuse quantity of gaseous reducing agents at a relatively low reducing temperature.

2. A process for producing finely divided tungsten which consists in reducing oxygen compounds of tungsten by means of a very large excess or profuse quantity of hydrogen at a relatively low reducing temperature.

3. A process for producing finely divided tungsten which consists in subjecting oxygen compounds of tungsten at a low reducing temperature to the action of a current of hydrogen of a much larger volume than required to reduce such oxygen compounds.

4. A process for producing finely divided tungsten which consists in subjecting oxygen compounds of tungsten at a relatively low reducing temperature to the action of a current of a gaseous reducing agent of much greater volume than required to accomplish reduction of the oxygen compound of tungsten.

5. A process for producing finely divided tungsten which consists in subjecting oxygen compounds of tungsten to the action of a gaseous reducing agent causing a reaction between them and then depriving the resulting product of its pyrophoric properties.

6. A process for producing finely divided tungsten which consists in subjecting oxygen compounds of tungsten to the action of a gaseous reducing agent causing a reaction between them and then treating the resulting product with ether to deprive it of its pyrophoric properties.

7. A process for producing finely divided tungsten which consists in treating oxygen compounds of tungsten with gaseous reducing agent and simultaneously eliminating the products of the reaction to prevent them from affecting it.

8. A process for producing finely divided tungsten which consists in reducing compounds of tungsten with a suitable agent to metal in a finely powdered uniform condition, and treating the resulting product to render it stable upon exposure to air, while maintaining, unaltered, said finely powdered uniform condition.

9. As a new article of manufacture, metallic tungsten in the form of very fine nearly black powder without any material admixture of other tungsten substances.

10. As a new article of manufacture, metallic tungsten in the form of very fine nearly black powder, stable upon exposure to atmospheric air.

In testimony, that I claim the foregoing as my invention, I have signed my name in presence of two subscribing witnesses.

FRITZ BLAU.

Witnesses:
HENRY HASPER,
WOLDEMAR HAUPT.